(12) United States Patent
Mehedy et al.

(10) Patent No.: US 10,917,234 B2
(45) Date of Patent: Feb. 9, 2021

(54) BLOCKCHAIN FOR ON-CHAIN MANAGEMENT OF OFF-CHAIN STORAGE

(71) Applicant: International Business Machines Corporation, Armonk, NY (US)

(72) Inventors: Lenin Mehedy, Doncaster East (AU); Yuan Yuan, Singapore (SG); Wenbin Zhang, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 254 days.

(21) Appl. No.: 15/969,995

(22) Filed: May 3, 2018

(65) Prior Publication Data

US 2019/0342084 A1    Nov. 7, 2019

(51) Int. Cl.
| H04L 29/06 | (2006.01) |
| H04L 9/08 | (2006.01) |
| H04L 9/06 | (2006.01) |
| G06F 16/18 | (2019.01) |
| G06F 16/182 | (2019.01) |

(52) U.S. Cl.
CPC ........ H04L 9/0825 (2013.01); G06F 16/1805 (2019.01); G06F 16/1837 (2019.01); H04L 9/0637 (2013.01); H04L 9/0643 (2013.01)

(58) Field of Classification Search
CPC ... H04L 9/0825; H04L 9/0637; H04L 9/0643; H04L 9/0819; H04L 2209/56; G06F 16/1837; G06F 16/182; G06F 16/1805
See application file for complete search history.

(56) References Cited

U.S. PATENT DOCUMENTS

| 2016/0330034 A1 | 11/2016 | Back et al. |
| 2017/0337534 A1 | 11/2017 | Goeringer et al. |
| 2017/0372300 A1 | 12/2017 | Dunlevy et al. |

FOREIGN PATENT DOCUMENTS

WO    WO-2018109010 A1 *    6/2018    ........... H04L 9/0827

OTHER PUBLICATIONS

El Defrawy, Karim, et al., "Founding Digital Currency on Secure Computation," Proceedings of the 2014 ACM SIGSAC Conference on Computer and Communications Security, pp. 1-14, ACM, 2014.
Eyal, Ittay, et al., "Bitcoin-NG: A Scalable Blockchain Protocol," NSDI, pp. 45-59, 2016.

* cited by examiner

*Primary Examiner* — Yogesh Paliwal

(57) ABSTRACT

An example operation may include one or more of splitting an encrypted file into a plurality of file fragments, distributing the file fragments to a plurality of storing peers for storing the file fragments off-chain, splitting an encryption key used to encrypt the file into a plurality of key fragments, encrypting each key fragment using a public key of a different storing peer, and storing the respectively encrypted key fragments on the distributed ledger such that each encrypted key fragment is associated with the encrypted file.

20 Claims, 11 Drawing Sheets

(File Sharing)

(Key Storage)

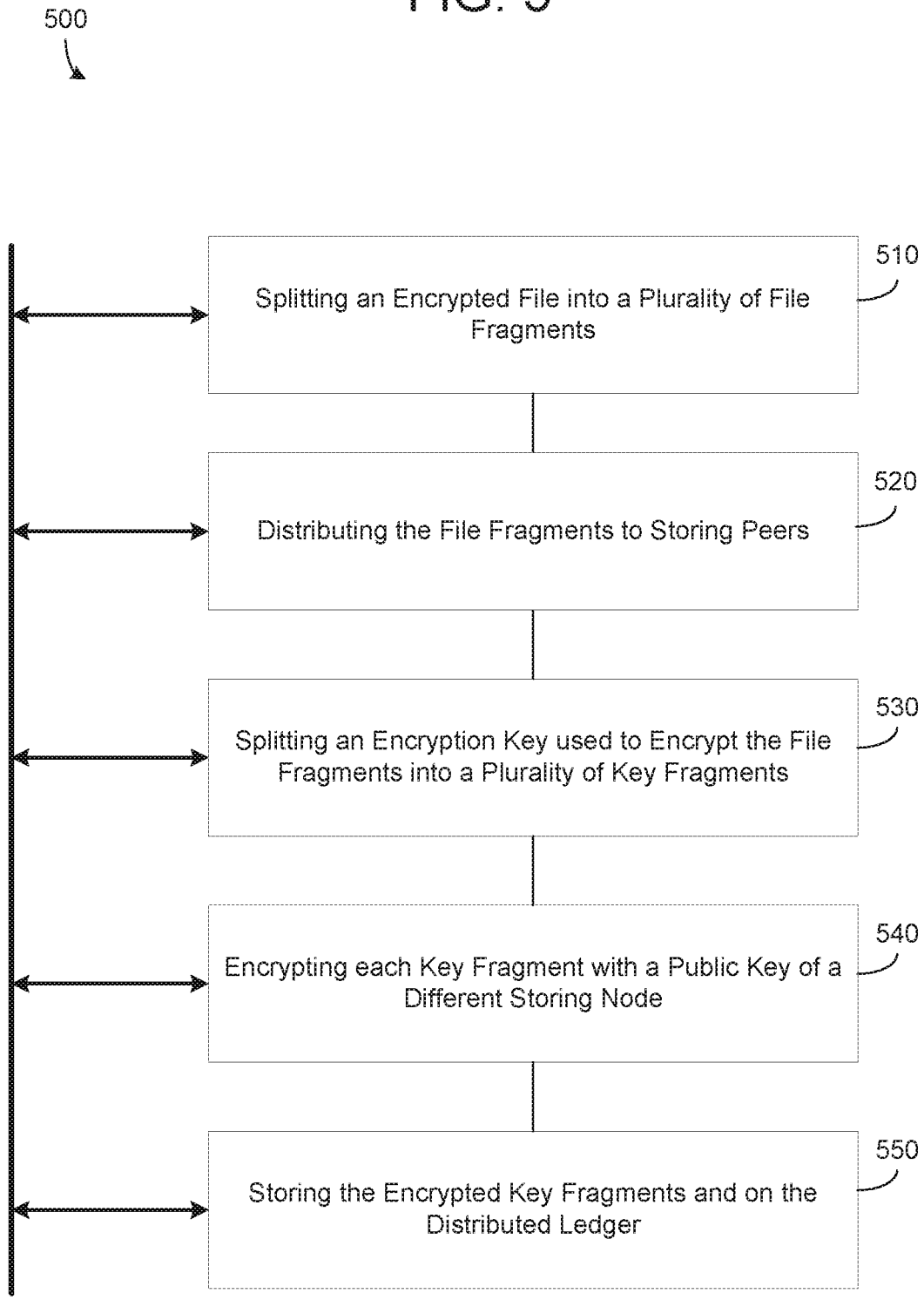

700 FIG. 7
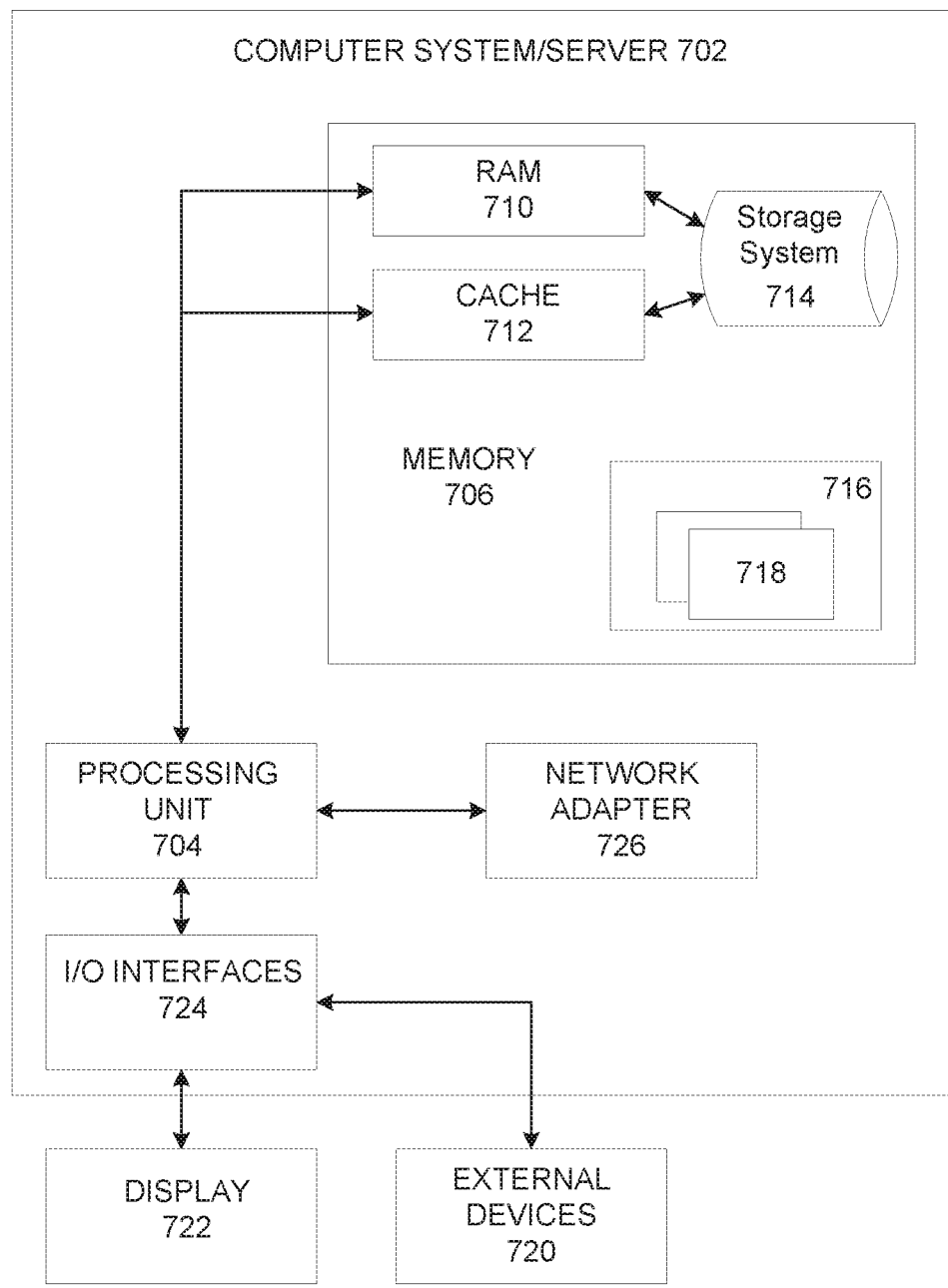

BLOCKCHAIN FOR ON-CHAIN MANAGEMENT OF OFF-CHAIN STORAGE

TECHNICAL FIELD

This application generally relates to a system for managing data stored off of a blockchain, and more particularly, to a blockchain for on-chain management of off-chain storage.

BACKGROUND

A ledger is commonly defined as an account book of entry, in which transactions are recorded. Meanwhile, a distributed ledger is ledger that is replicated in whole or in part among multiple computing nodes. A cryptographic distributed ledger (CDL) can include at least some of the following properties: irreversibility (once a transaction is recorded, it cannot be reversed), accessibility (any party can access the CDL in whole or in part), chronological and time-stamped (all parties know when a transaction was added to the ledger), consensus based (a transaction is added only if it is approved, typically unanimously, by parties on the network), verifiability (all transactions can be cryptographically verified). A blockchain is an example of a CDL. While the description and figures herein are described in terms of a blockchain, the instant application applies equally to any CDL.

The distributed ledger (such as blockchain) may hold a continuously growing list of records that apply cryptographic techniques such as storing cryptographic hashes relating to other blocks within a chain of blocks. Just to name a few purposes, a blockchain may store records related to financial transactions, information related to goods and services (i.e., products, packages, status, etc.), software models, digital assets, health data, carbon footprint, and the like. A decentralized scheme provides authority and trust to a decentralized blockchain network and enables its nodes to continuously and sequentially record their transactions on a "block", creating a unique "chain" referred to as a blockchain. Cryptography is used to ensure integrity of information, protect private information, secure an authentication of a transaction source, and the like.

Because of the limited storing capability of blockchain ledger and the cumulative size of stored data becomes large and ever growing, off-chain storage has been a solution for blockchain to resolve the storage problem. The usual solution is to store data off-chain and put their hash in the blockchain ledger for a reference so that blockchain itself is not bloated with large files over time. As the data are stored off-chain and decoupled from blockchain itself, it introduces additional trust issues around access control, modifications as well as availability of the data in a trusted way. A trusted off-chain storage may need to fulfil requirements, such as 1) the trace of the access to off-chain stored data needs to be maintain in a trusted way and no unauthorized access to prevent leakage; 2) off-chain stored data and on-chain data hash need to be maintained consistent; 3) the off-chain stored data needs to be always retrievable by a party with permission; 4) it needs to avoid un-recoverable corruption/damage to off-chain stored data, and the like.

In order to protect private information, nodes within the blockchain need to encrypt off-chain stored data using symmetric encryption algorithm, such as AES, and manage the encryption keys. Encryption keys are typically managed (exchanged, verified, etc.) off-chain and made available and usable to users of an organization who know the key credentials for that organization. However, using off-chain management and exchange of encryption keys provides additional vulnerability to the blockchain network and risks keys being exposed to unauthorized parties. Furthermore, the blockchain network has no way to prevent authorized users of a key from using the key for unauthorized purposes. As such, what is needed is a new mechanism for securely managing and exchanging encryption keys.

SUMMARY

One example embodiment may provide a system that includes one or more of a network interface configured to transmit data over a network, and a processor configure to one or more of split an encrypted file into a plurality of file fragments, distribute the file fragments to a plurality of storing peers configured to store the file fragments off-chain, split an encryption key used to encrypt the file into a plurality of key fragments, encrypt each key fragment based on a public key of a different storing peer, and store the respectively encrypted key fragments on a distributed ledger that is accessible to a plurality of blockchain peers such that each encrypted key fragment is associated with the encrypted file.

Another example embodiment may provide a method that includes one or more of splitting an encrypted file into a plurality of file fragments, distributing the file fragments to a plurality of storing peers for storing the file fragments off-chain, splitting an encryption key used to encrypt the file into a plurality of key fragments, encrypting each key fragment using a public key of a different storing peer, and storing the respectively encrypted key fragments on the blockchain ledger such that each encrypted key fragment is associated with the encrypted file.

A further example embodiment may provide a non-transitory computer readable medium comprising instructions, that when read by a processor, cause the processor to perform one or more of splitting an encrypted file into a plurality of file fragments, distributing the file fragments to a plurality of storing peers for storing the file fragments off-chain, splitting an encryption key used to encrypt the file into a plurality of key fragments, encrypting each key fragment using a public key of a different storing peer, and storing the respectively encrypted key fragments on the blockchain ledger such that each encrypted key fragment is associated with the encrypted file.

BRIEF DESCRIPTION OF THE DRAWINGS

FIG. 5 is a diagram illustrating of method for on-chain management of access to off-chain storage, according to example embodiments.

FIG. 7 is a diagram illustrating a computer system configured to support one or more of the example embodiments.

DETAILED DESCRIPTION

Figure 1:
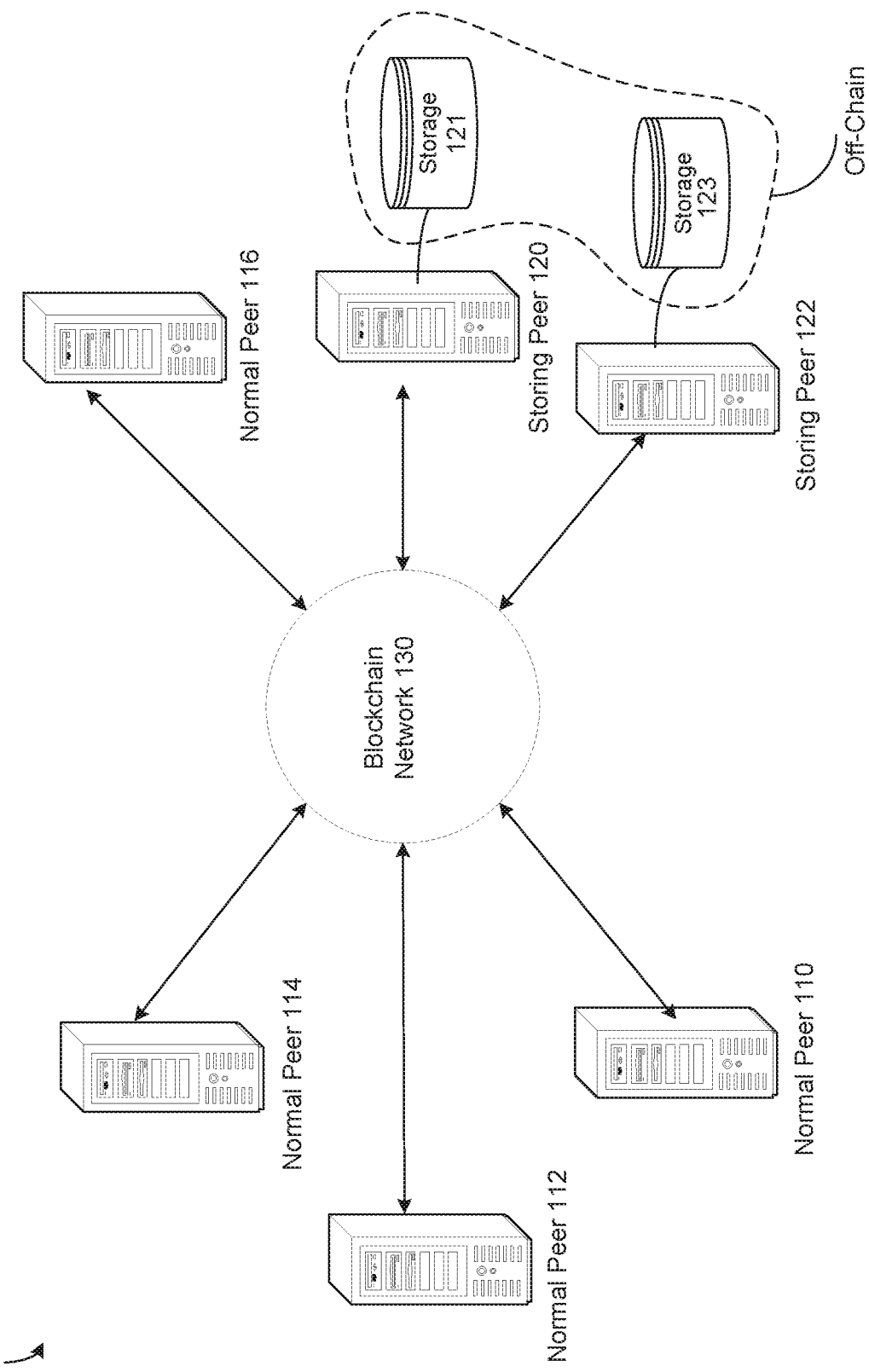
FIG. 1 is a diagram illustrating a blockchain network for off-chain storage, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

The instant application in one embodiment relates to a system for managing data stored off of a blockchain, and in another embodiment relates to a distributed ledger (such as a blockchain) for managing access and encryption keys on-chain for accessing files stored off-chain in a manner that is verifiable to all nodes of the chain thereby improving security and alleviating entities from having to exchange and manage keys on their own.

Example embodiments provide methods, devices, networks and/or systems, which provide for off-chain storage of data and/or files and on-chain management of encryption keys which can be used to access the off-chain stored data and files. In a related blockchain network, encryption keys are typically exchanged through a secure private channel and/or public channel with public key infrastructure between different parties. In this related example, party A and party B typically must establish a secure private channel beforehand so that they can share the encryption keys, or they must use a public key infrastructure and share their public keys with each other enabling each party to use the other's public key to encrypt the encryption key and send it to the other through public channel.

The example embodiments provide a new mechanism for managing the encryption keys on-chain. Furthermore, the encryption keys managed on-chain can be used to control access to files that are stored off-chain. Accordingly, even the user that uploaded a file will not be able to access the file without approval from the blockchain network. In these examples, there is no need for parties A and B to establish any secure private channel or public channel to share keys. Furthermore, the blockchain may separately manage file storage and storage of encryption keys creating an additional layer of security. In addition, there is no need for a party to manage their own encryption keys because keys are managed on the blockchain, unlike related blockchain protocols which require a party to manage their keys securely.

According to various embodiments, the blockchain network may include one or more storing nodes (also referred to as storing peers) which are connected to the blockchain but which also include an off-chain component for off-chain storage in addition to traditional peer functionality. Access to this file storage component is managed through the blockchain ledger; namely it reads access requests from the ledger and responds to the ledger, except receiving/sending file fragments from/to the party specified in the request from the ledger. In this way, access to the off-chain storage is strictly controlled through the blockchain ledger. In an example, in which the storing peer is completely off-chain, the storing peer may be completely controlled by a hosting node, rather than by a node of the blockchain network.

The example embodiments provide for management of encryption keys on-chain for controlling files stored off-chain. In some examples, a blockchain peer node may generate an encryption key and fragment the encryption key into a plurality of key fragments. In these examples, the key fragments may be encrypted using a public key of a different storing node and stored on the blockchain ledger. The encryption key may be fragmented using a shared secret that fragments the encryption key into N fragments, where only n of the fragments are needed to reconstruct the entire key, where n<N. In this scenario, the encryption key can be reconstructed at a later time even when one or more of the storing nodes is not available. Some additional benefits include that one key may be used for one file, and that the encryption key may be provable via the blockchain ledger. Furthermore, managing encryption keys via a blockchain ledger also provides an additional layer of security because even the node that uploads the file for storage cannot access the file without approval from the blockchain.

As described herein, a blockchain network (also referred to as blockchain) is a distributed system which includes multiple nodes that communicate with each other. The blockchain may operate programs called chaincode (e.g., smart contracts, etc.), holds state and ledger data, and executes transactions. Some transactions are operations invoked on the chaincode. In general, blockchain transactions typically must be "endorsed" by certain blockchain members and only endorsed transactions may be committed to the blockchain and have an effect on the state of the blockchain. Other transactions which are not endorsed are disregarded. There may exist one or more special chaincodes for management functions and parameters, collectively called system chaincodes. The smart contracts may implement the off-chain storage of files and on-chain management of encryption keys.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information. The example embodiments also provide a new type of node, referred to as a storing node. Storing nodes implement an off-chain storage function and are not accessible other than through a distributed ledger of the blockchain.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

FIG. 1 illustrates a blockchain system 100 for off-chain storage and on-chain key management, according to example embodiments. Referring to FIG. 1, the blockchain system 100 includes a blockchain nodes 110, 112, 114, and 116, 120, and 122. In this example, blockchain peer 110 (also referred to as a normal peer) is performing a method of storing a fragment file via a storage elements 121 and 123 managed by storing peers 120 and 122, respectively. The file may be encrypted by e.g., AES, and then be fragmented into a plurality of file fragments. Furthermore, the blockchain peer 110 may manage the encryption key via a distributed ledger (blockchain ledger) which is also shared by the other normal blockchain peers 112, 114, and 116.

In the example of FIG. 1, each storing peer 120 and 122 may include an off-chain storing (database) component 121 and 123, respectively, providing additional storage service for the system 100. These peers may play a special role in the system 100 similar to that some nodes playing special roles in traditional blockchain networks 130 (e.g., miners in Bitcoin/Ethereum, orderer/endorser in Hyperledger Fabric, etc.), and the like. Each blockchain peer node 110-116 may have an additional communication channel, referred to as a storage channel which can be used to transmit files and data to-and-from the storing peers 120 and 122. The storage channels may be different to that of conventional communication channel for gossip protocol and support unicast. For example, the storage channel does not require a blockchain communication but instead may use additional protocols such as HTTP, FTP, UDP, GRPC, and the like.

A client (not shown) may request storage of a file via any of the blockchain peer nodes 110-116. In this example, the blockchain peer 110 (requestor) may receive a request to store a file. In response, the blockchain peer 110 may encrypt the file using an encryption key, fragment the encrypted file into file fragments, and distribute different fragments among the plurality of storing peers 120 and 122 for storage in respective off-chain storing elements 121 and 123. In addition, the blockchain peer 110 may fragment the encryption key used to encrypt the file fragments, and transmit key fragments to the normal peers 12, 114, and 116 for storage on the distributed ledger. These key fragments may be encrypted using different public keys of the storing peers 120 and 122. For example, each key fragment may be encrypted using a public key of a different storing peer preventing one storing peer from being able to recover the encryption key on their own. Accordingly, both file storage and encryption keys can be separately managed through the blockchain ledger without the need for separate management of either to be performed by the nodes.

One of the differences between the file and the key is that the file is encrypted first and then separated into many fragments each of which is sent to a different storing node. In contrast, the key used to encrypt the file is separated into many fragments first and then encrypted by a respective storing node's public key, and stored on ledger. When a client requests a copy of the file, the storing peers receive the request from the ledger and then identifies the file and the encrypted key fragments on the blockchain ledger using a file ID. Next, each storage peer then decrypts its respective key fragment (encrypted using its respective public key) using its corresponding private key and encrypts the decrypted fragment using the public key of the client node/user. When enough storing peers decrypt their respective key fragment and provide it to the client node/user (e.g., encrypted using the client node's/user's public key) the client node/user may decrypt the encrypted key fragments and reconstruct the encryption key.

The key which encrypts the document/file is normally very small and does not need to be stored off-chain. A key may be separated into many, say N, fragments using secret sharing scheme, so that a portion, say n, of these fragments can reconstruct the key but any n (n<N) fragments cannot reconstruct the key, in particular, each fragment is random. Then each key fragment needs to be encrypted by a storing node's public key and stored on the ledger. The key fragments need to be encrypted otherwise anyone can see all of fragments and can then reconstruct the key, and it can be stored on ledger because it is small. Since each key fragment encrypted by a storing node's public key, that storing node has the private key to decrypt it, the storing node is required to decrypt the key fragment encrypted using its public key. Then the storing node needs to send the decrypted key share to the requester but cannot simply send the decrypted version which could be read by anyone. Therefore, the storing node encrypts its decrypted key fragment using the requester's public key so that only the requester can decrypt it. Once again, this new encrypted fragment can be stored on ledger because it is small. After collecting at least n of the key shares encrypted by the requester's public key, the requester can then decrypt them to get the original key fragments and reconstruct the key.

After reconstructing the encryption key used to encrypt the file, the blockchain peer initiating the request can request the file fragments from the storing nodes, reconstruct the encrypted file from the fragments, and decrypt it to recover the original file using the reconstructed encryption key.

Figure 2A:
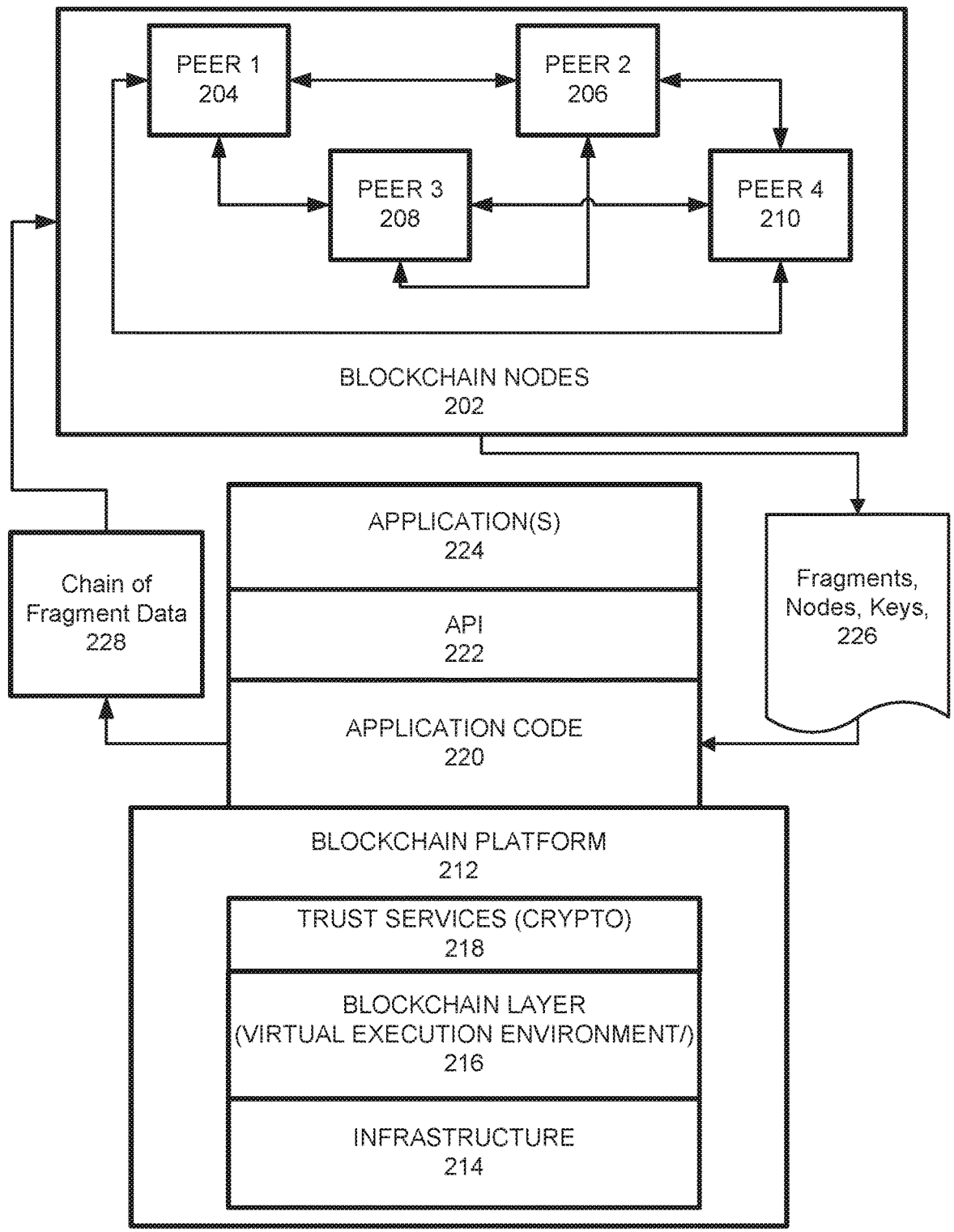
FIG. 2A is a diagram illustrating a peer node blockchain architecture configuration, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes such as 204-210. In this example, four nodes are depicted by example only. These nodes may participate in a number of activities, such as blockchain transaction addition and validation process (consensus). In this example, one or more of the blockchain nodes 204-210 may endorse transactions and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, key fragments, file fragments, node keys, and the like, within information 226 may be processed by one or more processing entities (e.g., virtual machines) included in the blockchain layer 216. The confirmation result 228 may include a cryptographic record of key fragments, file fragments, and node keys that have been stored by the blockchain for purposes of a subsequent audit. The physical infrastructure 214 may be utilized to retrieve any of the data or information described herein.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details. In FIG. 2A, the chaincode may be used to fragment a file and an encryption key into partial fragments, and distribute the fragments among storage nodes.

Figure 2B:
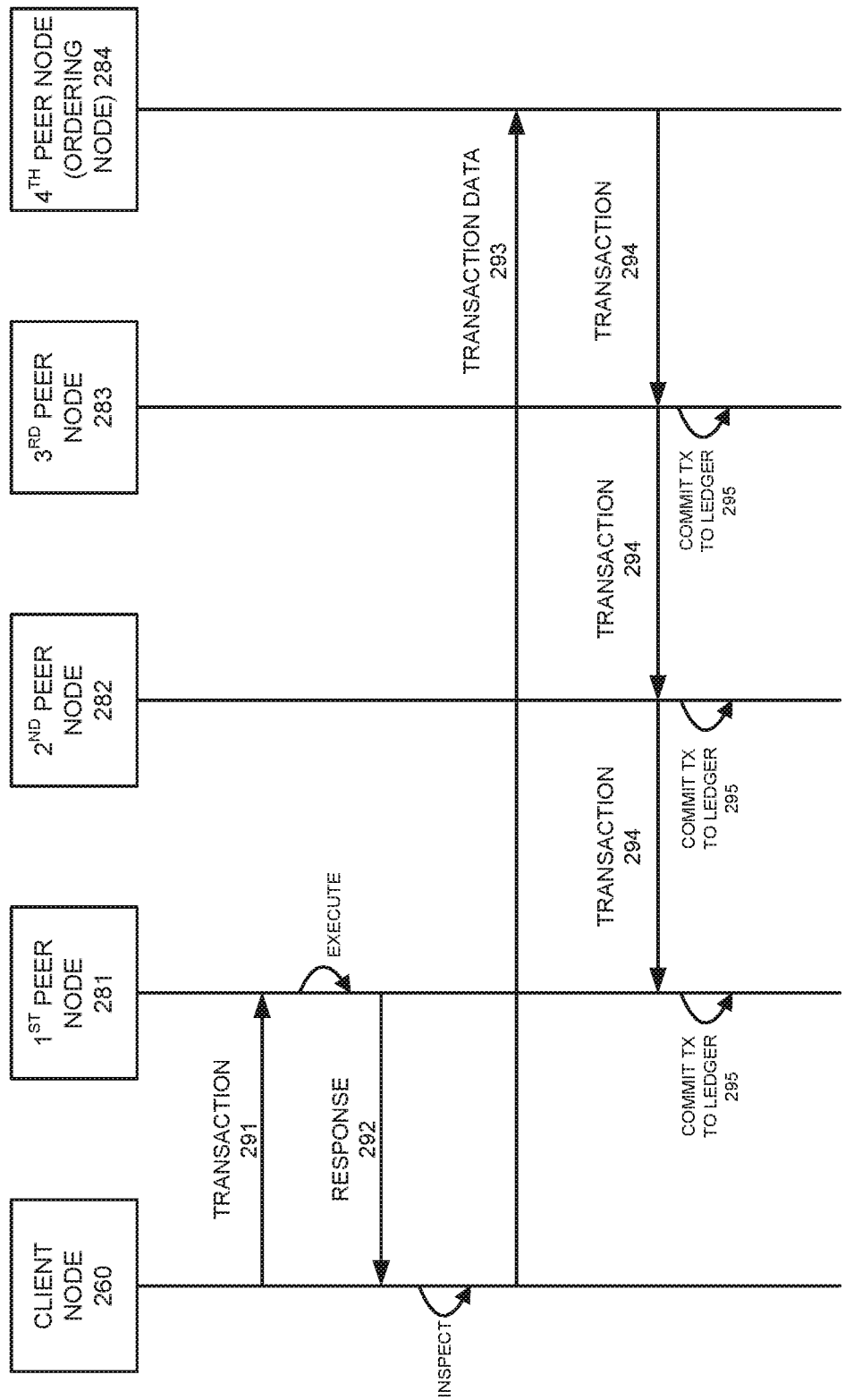
FIG. 2B is a diagram illustrating a peer node communication process, according to example embodiments.

FIG. 2B illustrates an example of a transactional flow 250 between nodes of the blockchain in accordance with an example embodiment. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2B, the client node 260 initiates the transaction 291 by constructing and sending a request to the peer node 281, which is an endorser. The client 260 may include an application leveraging a supported software development kit (SDK), such as NODE, JAVA, PYTHON, and the like, which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3:
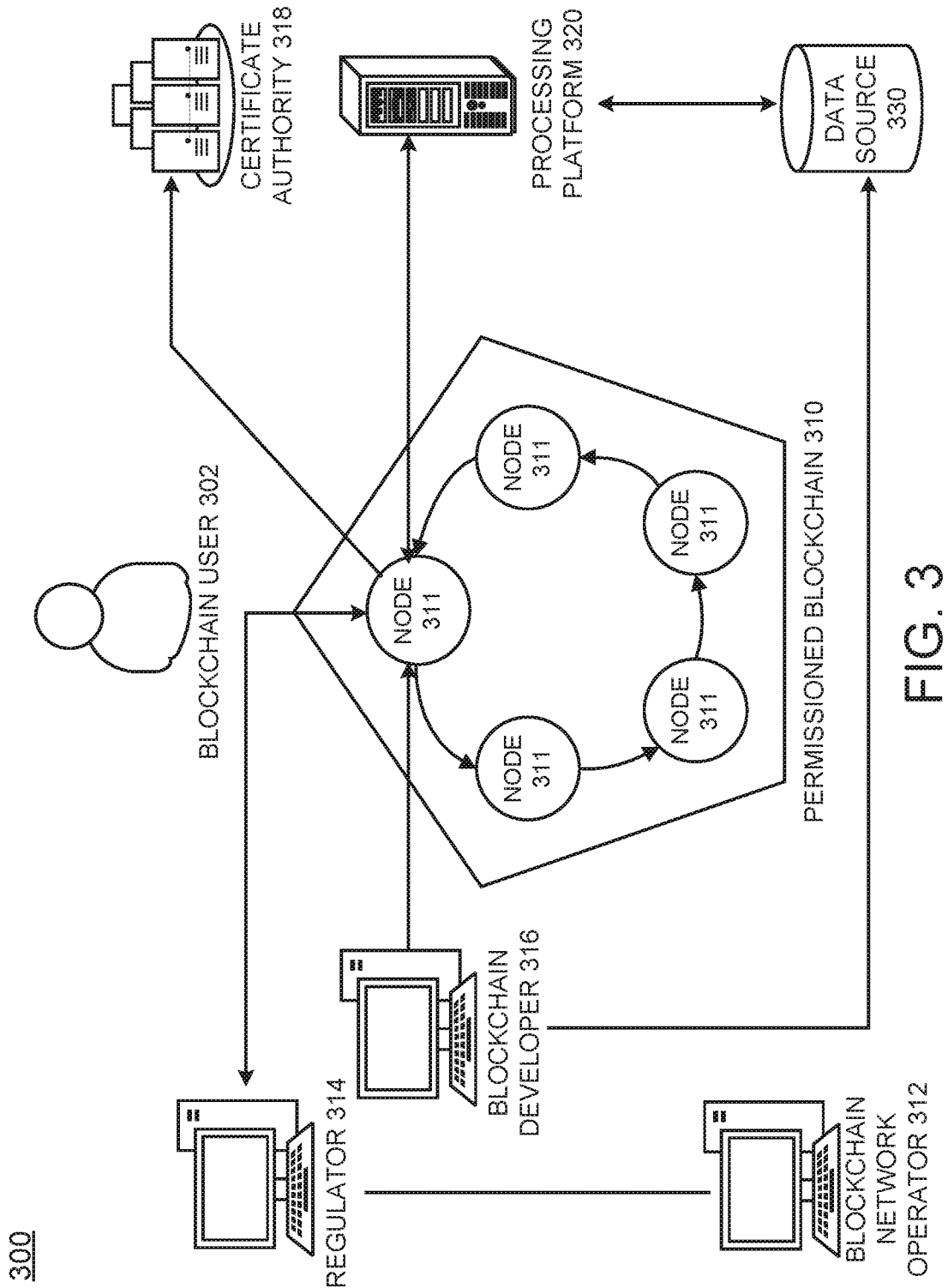
FIG. 3 is a diagram illustrating a permissioned blockchain network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 312 manage member permissions, such as enrolling the regulator system 314 as an "auditor" and the blockchain user 302 as a "client." An auditor could be restricted only to querying the ledger whereas a client could be authorized to deploy, invoke, and query certain types of chaincode. As another example, an auditor may be used to determine an amount of value earned by a storage node based on files and/or encryption keys which the storage node stores (at least partially).

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 311. Before proceeding with any transactions, the peer node 311 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Figure 4A:
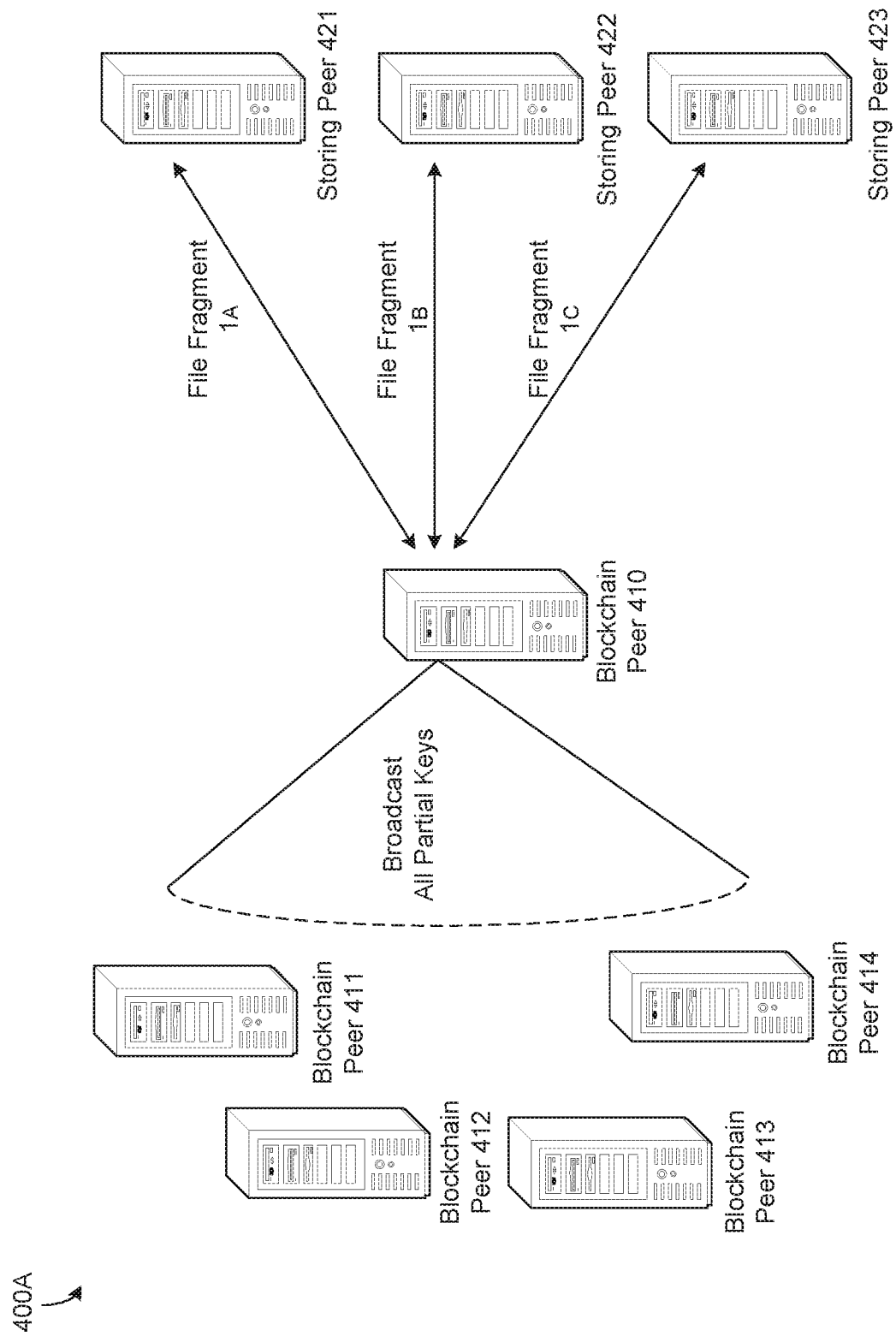
FIGS. 4A-4C are diagrams illustrating a process for on-chain management of access to off-chain storage, according to example embodiments.
Figure 4B:
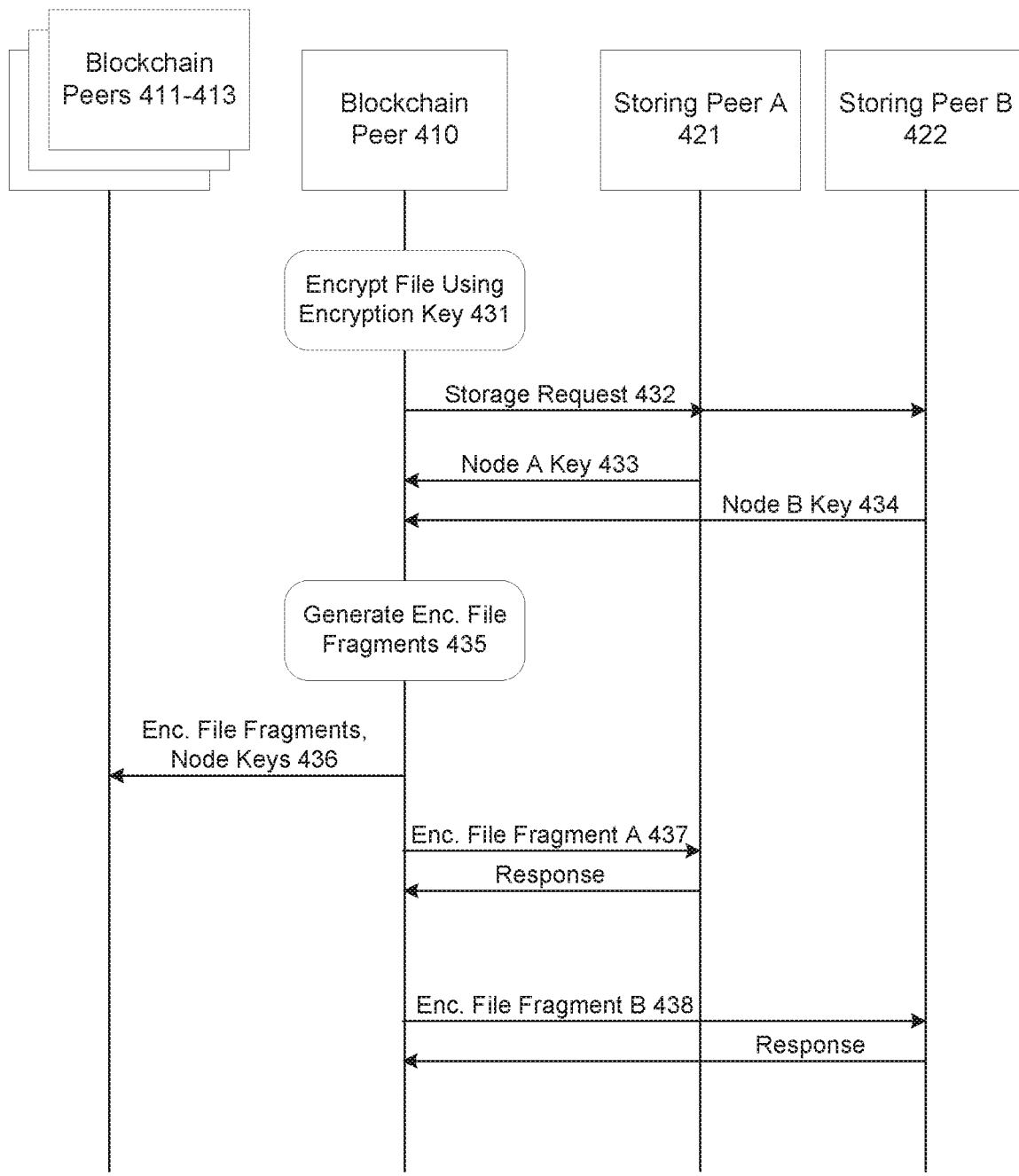
Figure 4C:
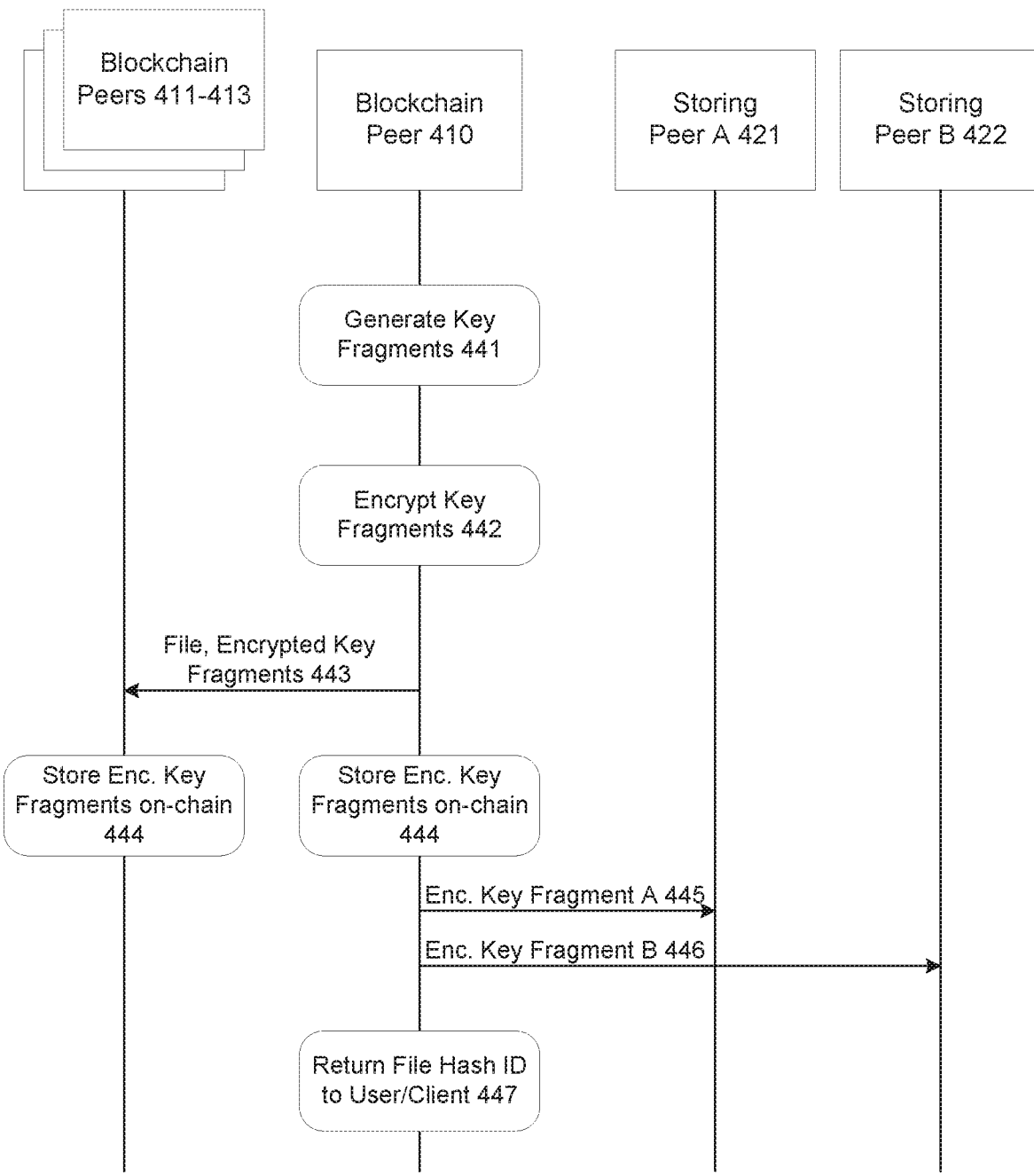

FIGS. 4A-4C illustrate processes 400A-400C for on-chain management of access to off-chain storage, according to example embodiments. Referring to FIG. 4A, a blockchain network is shown which includes a plurality of blockchain peer nodes 410-414 and a plurality of storing peers 421-423 which maintain a storage component that is not part of the blockchain (i.e., off-chain). In this example, the blockchain peer node 410 receives a request to store a file from a client device (not shown). The blockchain peer node 410 may store the file in an off-chain storage while controlling access to the file through an on-chain secure authorization process. In some embodiments, the blockchain peer node 410 may transmit data to other blockchain peer nodes in the blockchain network (e.g., blockchain peer nodes 411-414) and the blockchain peer node 410 may communicate with storing peers through broadcast transmission, respective unicast transmissions, and/or the like.

FIG. 4B illustrates a process 400B of the blockchain peer 410 storing a file off-chain at the storing peers 421 and 422. In this example, a user may upload a file to the blockchain node 410. In response, the blockchain peer 410 may generate a symmetric encryption key and, in 431, encrypt the file using the encryption key. In 432, the blockchain peer 410 may broadcast a storage request with details such as file hash, file-part size (min and max bytes), availability requirement, and the like. The storage request may be broadcast out to all storing peers and other blockchain peers if need be. Upon receiving the storage request, interested storing peers (e.g., storing peer A 421 and storing peer B 422) may respond by broadcasting their public-key, available storage size, URL, storage cost, and the like. In the example of FIG. 4B, the storing peer A 421 and the storing peer B 422 respond in steps 433 and 434, with their respective public keys.

Upon collecting such responses from N (a minimum number of requests) storing peers, in 435, the blockchain peer 410 may generate N shares of the encrypted file such that n of them can be used to recover the full file. For example, Shamir's secret sharing algorithm can be used for this purpose. Next, in the blockchain peer 410 may hash each file share with the public key of the selected storing peer for this file share and generates a hash for the share. In 436, the blockchain peer 410 may broadcast the file hash, each share hash and corresponding public keys of the storing peers to other blockchain peers 411-413 peers to persist the information about the file hash in a chain of the distributed blockchain ledger managed and persisted through the plurality of blockchain peers 410-413. Furthermore, in 437 the blockchain peer 410 may unicast the file share A (encrypted with the public key of storing peer A 421) to storing peer A 421 and in 438 the blockchain peer 410 may respectively unicast the file share B (encrypted with the public key of storing peer B 422) to storing peer B 422. Upon successful storage, the storing peers A 421 and B 422, respectively, respond with a success response which the blockchain peer 410 may then broadcast to the other blockchain peers 411-413 network so that confirmation is also stored in the chain of the ledger.

FIG. 4C illustrates an example of a process 400C in which the encryption key used to encrypt the shared file is stored on the distributed blockchain ledger thereby enabling management of access to the encryption key (and the off-chain storage) through the ledger. Referring to FIG. 4C, in 441 the blockchain peer 410 may generate N shares of the encryption key by fragmenting the key into the N shares, where n of them can be used to recover the key similar to the generation of file share. Furthermore, in 442, the blockchain peer 410 may encrypt each key fragment share with corresponding storing node's public key to generate a key share. In 443, the blockchain peer 410 may broadcast the file hash, each share hash, key hash, each encrypted key share and corresponding public key to the other blockchain peers 411-413 in the network to persist in the blockchain ledger so that the storing peers 421 A and 422 B can be incentivized accordingly (if applicable). This record will then be used later to recover the encryption key and then the file from the storing peers.

Furthermore, in 444, the blockchain peer 410 and the other blockchain peers 411-413 store the encrypted key fragments on the distributed ledger. In this example, each key fragment may be encrypted using a public key of a respective storing peer thus enabling only that storing peer (having a corresponding private key of the public key) with the ability to decrypt the key fragment even though stored on the public blockchain. Furthermore, in 445 and 446 the blockchain peer 410 transmits respective encrypted key shares to each of the storing peer A 421 and the storing peer B 422. Here, the fragment in key share sent to storing peer A 421 in 445 is encrypted using the public key of the storing peer A 421, and the fragment in key share sent to storing peer B 422 in 446 is encrypted using the public key of storing peer B 422. Furthermore, in 447 the blockchain peer 410 transmits a file hash (or id) of the file to the user for reference and later retrieval.

According to various embodiments, a file stored off-chain may be retrieved by a user through the blockchain network. In other words, a user who stores the file may not simply be able to retrieve the file, but instead may have to go through the blockchain network to retrieve the file. Here, the user may query any blockchain peer for a file based on a file id. In response, the peer may retrieve the file hash from the ledger based on the file id. Next, the blockchain peer node may broadcast a file retrieve request with the file hash and its own public key. Upon receiving the file retrieve request, each storing peer decrypts its respective key fragment, encrypts the decrypted key fragment with the public key of the requester, and transmits the encrypted key fragment to the requester.

In this example, after the requester receives n of such responses, it recovers the encryption key. Next, the requester may broadcast the file hash, file share hash and the key share hash so that storing peer can check that the peer indeed was able to recover the file share information that it is storing. The storing peers may verify that the key hash matches with its own copy and respond directly through storage channel with the file share. The peer may then recover the encrypted file from such n file shares from n storing nodes. In addition, the peer then decrypts the file with the previously recovered key, sends a successful recovery response to blockchain as a record of successful recovery so that the storage nodes can be incentivized accordingly (if applicable). The peer then returns the file to the user.

In some embodiments, a stored file may be updated through the blockchain network. For example, a user may upload a new file with an existing file ID to a peer to modify a previously stored version of the file. Next, the peer may retrieve the file hash with the file id from the ledger, generate a new symmetric key and encrypt the new file. The peer may broadcast an update request with the original file hash, new file hash, file share size, and the like, to the storing peers. In response, storing peers that were storing parts of the original file, respond with the key share encrypted by the public key of the requesting peer along with the file share hash. For example, the peer may receive responses from all of the N storing peers such that it can update their shares.

In this example, after the peer receives N of such responses, it recovers the file encryption key. Then peer again broadcasts the file hash, file share hash and the key share hash so that storing peers can check that the peer indeed was able to recover the file share information that it is storing. The storing peer may verify that the key hash matches with its own copy and responds directly through storage channel with the file share. The peer then recovers the encrypted file from responses from the N storing peers. In addition, the peer then decrypts the file with the previously recovered key and matches that the file hash is correct and selects the N storing peers again to store the updates. The peer then calculates N shares of the new encrypted file such that n of them can be used to recover the full file. Peer then encrypts each share with the public key of the selected storage node for this share and generates a hash for the share. The peer then broadcast file hash, each share hash and corresponding public key of the storage node to other peers to persist the updated file in the chain. Furthermore, the peer then unicasts the file shares to each of the storing peers.

As another example, all of the original set of storing peers may not respond. In this case, the peer may send a store request and wait for any new storing peers who would be interested to take part in storing the file. Assume some new interested storing nodes responded by broadcasting their public-key, available storage size, URL, storage cost etc. In this example, the peer will choose N of the storing peers and follow the protocol for storing a new file. The peer then sends an invalidated file request to the network to invalidate the original file hash and id so that the data stored in original set of storing peers are no longer useful. The peer then returns the new file id to the user.

In some examples, a file stored off-chain may be deleted through the blockchain network. In this example, the user may submit a deletion request of a file which was originally uploaded by the user, to the peer to which the user uploaded. For example, the peer may retrieve the file hash from the ledger based on the file id. The peer may broadcast a file delete request with the file hash. Upon receiving the file delete request, the storing peers that are storing parts of file and keys delete their stored parts and broadcast their deletion results. Upon receiving the response from storing peers, the peer returns the deletion result to the user, the numbers of successful and failed deletion responses, and the number of storing peers that store a part of the file but does not respond.

FIG. 5 illustrates of method 500 for on-chain management of access to off-chain storage, according to example embodiments. For example, the method 500 may be performed by a computing node such as a server, a blockchain node, a user device, a database, a storage node, a combination thereof, and the like. Referring to FIG. 5, in 510, the method may include splitting an encrypted file into a plurality of file fragments, and in 520, distributing the file fragments to a plurality of storing peers for storing the file fragments off-chain. Here, each storing peer may receive a different file fragment encrypted using an asymmetric encryption key which is generated by a blockchain peer. In some embodiments, method may further include splitting the encrypted file into the plurality of file fragments using a shared secret in which less than all of the encrypted file fragments are needed to reconstruct the encrypted file.

In 530, the method may include splitting the encryption key used to encrypt the file into a plurality of key fragments and, in 540, encrypting each key fragment using a public key of a different storing peer. For example, the splitting the encryption key may include splitting the encryption key into the plurality of key fragments using a shared secret in which less than all of the key fragments are needed to reconstruct the encryption key. Also, the key may be split into a number of fragments corresponding to a number of storing peers, however embodiments are not limited thereto and it may be split into less fragments or more fragments. Key fragments may be encrypted using public keys of different storing nodes to prevent a single storing node from being able to decrypt the key. In this example, the method may include encrypting each file fragment with a respective public key of the storing peer where the file fragment is being stored prior to distributing the encrypted file fragments to the storing peers.

In 550, the method may include storing the respectively encrypted key fragments on a distributed ledger (such as blockchain) that is accessible to a plurality of blockchain peers such that each encrypted key fragment is associated with the encrypted file.

In some embodiments, the plurality of storing peers are connected to the blockchain network and each storing peer includes a storage component implemented off-chain from the blockchain network and controlled by the respective storing peer. Meanwhile, other normal blockchain node peers may be included on the blockchain network. In this case, the method may further include broadcasting the encrypted key fragments and the encrypted file fragments to a plurality of blockchain peer nodes included in the blockchain network for storage on the distributed ledger to create a permanent record of the key shares and file shares in encrypted form so that the ledger can be audited and verified.

In some embodiments, the plurality of identified computing nodes may include a plurality of storage nodes having a storage component implemented off-chain from a blockchain network that controls the distributed ledger. In some embodiments, the method may further include encrypting a file with the encryption key and storing the encrypted data file off-chain. In this example, the method may further include splitting the encrypted file into a plurality of encrypted file fragments, and distributing the encrypted file fragments among the plurality of identified computing nodes.

In some embodiments, the split encryption key may be configured to be restored based on some but not all of the plurality of key fragments. In some embodiments, the method may further include transmitting, to the plurality of identified computing nodes, a request to retrieve the encrypted key fragments. In some embodiments, the method may further include, in response to receiving enough encrypted key fragments to restore the encryption key but not all of the encrypted key fragments, decrypting the received encrypted key fragments and restoring the encryption key based on the decrypted key fragments.

Figure 6A:
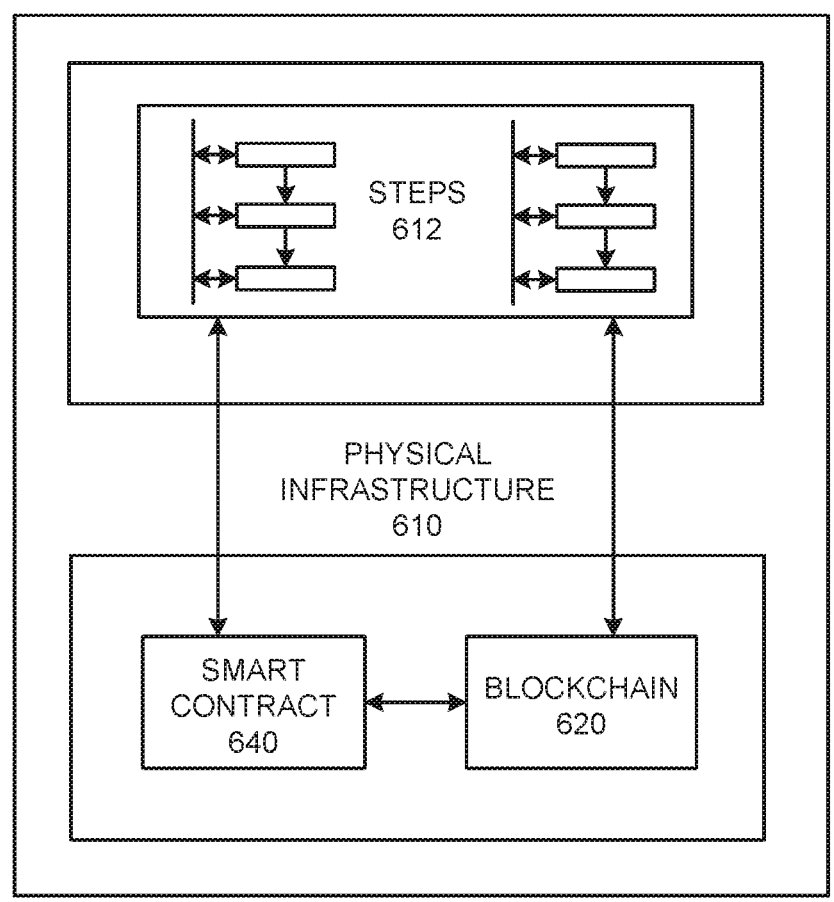
FIG. 6A is a diagram illustrating a physical infrastructure configured to perform various operations on the blockchain in accordance with one or more operations described herein, according to example embodiments.

FIG. 6A illustrates an example physical infrastructure configured to perform various operations on the blockchain in accordance with one or more of the example methods of operation according to example embodiments. Referring to FIG. 6A, the example configuration 600 includes a physical infrastructure 610 with a blockchain 620 and a smart contract 640, which may execute any of the operational steps 612 included in any of the example embodiments. The steps/operations 612 may include one or more of the steps described or depicted in one or more flow diagrams and/or logic diagrams. The steps may represent output or written information that is written or read from one or more smart contracts 640 and/or blockchains 620 that reside on the physical infrastructure 610 of a computer system configuration. The data can be output from an executed smart contract 640 and/or blockchain 620. The physical infrastructure 610 may include one or more computers, servers, processors, memories, and/or wireless communication devices.

Figure 6B:
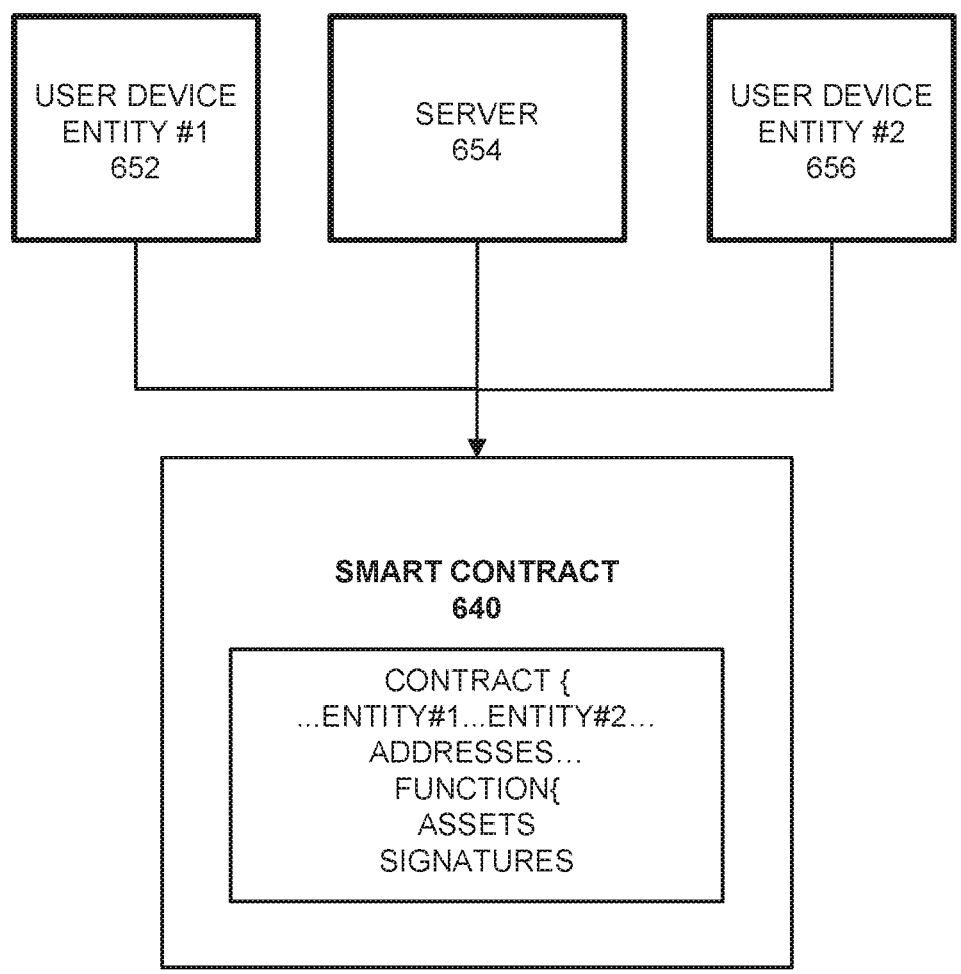
FIG. 6B is a diagram illustrating a smart contract configuration among contracting parties and a mediating server configured to enforce smart contract terms on a blockchain, according to example embodiments.

FIG. 6B illustrates an example smart contract configuration among contracting parties and a mediating server configured to enforce the smart contract terms on the blockchain according to example embodiments. Referring to FIG. 6B, the configuration 650 may represent a communication session, an asset transfer session or a process or procedure that is driven by a smart contract 640 which explicitly identifies one or more user devices 652 and/or 656. The execution, operations and results of the smart contract execution may be managed by a server 654. Content of the smart contract 640 may require digital signatures by one or more of the entities 652 and 656 which are parties to the smart contract transaction. The results of the smart contract execution may be written to a blockchain as a blockchain transaction.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

FIG. 7 is not intended to suggest any limitation as to the scope of use or functionality of embodiments of the application described herein. Regardless, the computing node 700 is capable of being implemented and/or performing any of the functionality set forth hereinabove.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 710 and/or cache memory 712. Computer system/server 702 may further include other removable/non-removable, volatile/non-volatile computer system storage media. By way of example only, storage system 714 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility 716, having a set (at least one) of program modules 718, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices 720 such as a keyboard, a pointing device, a display 722, etc.; one or more devices that enable a user to interact with computer system/server 702; and/or any devices (e.g., network card, modem, etc.) that enable computer system/server 702 to communicate with one or more other computing devices. Such communication can occur via I/O interfaces 724. Still yet, computer system/server 702 can communicate with one or more networks such as a local area network (LAN), a general wide area network (WAN), and/or a public network (e.g., the Internet) via network adapter 726. As depicted, network adapter 726 communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

For example, the processor 704 may split an encrypted file into a plurality of file fragments and distribute the file fragments to a plurality of storing peers for storing the file fragments off-chain, split an encryption key used to encrypt the file into a plurality of key fragments and encrypt each key fragment using a public key of a different storing peer, and store the respectively encrypted key fragments on a distributed ledger that is accessible to a plurality of blockchain peers such that each encrypted key fragment is associated with the encrypted file.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A computing system, comprising:
a hardware processor configured to
split an encrypted file into a plurality of file fragments based on a secret sharing scheme in which less than all of the encrypted file fragments are needed to reconstruct the encrypted file;
distribute the file fragments to a plurality of storing peers configured to store the file fragments off-chain;
split an encryption key used to encrypt the file into a plurality of key fragments;
encrypt each key fragment based on a public key of a different storing peer; and
store the respectively encrypted key fragments on a distributed ledger that is accessible to a plurality of blockchain peers such that each encrypted key fragment is associated with the encrypted file.

2. The computing system of claim 1, wherein the hardware processor is configured to encrypt the file with a symmetric encryption key.

3. The computing system of claim 1, wherein the hardware processor is configured to encrypt each key fragment with a respective public key of the storing peer where the file fragment is stored prior to distribution of the encrypted file fragments to the storing peers.

4. The computing system of claim 1, wherein the hardware processor is configured to split the encryption key into the plurality of key fragments based on a secret sharing scheme in which less than all of the key fragments are needed to reconstruct the encryption key.

5. The computing system of claim 4, wherein the hardware processor is further configured encrypt each key fragment with a respective public key of a storing peer from among the plurality of storing peers prior to storage of the encrypted key fragments on the distributed ledger.

6. The computing system of claim 1, wherein the plurality of storing peers are connected to the blockchain network and each storing peer includes a storage component implemented off-chain from the blockchain network and controlled by the respective storing peer.

7. The computing system of claim 1, wherein the hardware processor is configured to control the network interface to broadcast the encrypted key fragments and the fragments of encrypted file to a plurality of blockchain peer nodes included in the blockchain network for storage on the distributed ledger.

8. A method, comprising:
splitting an encrypted file into a plurality of file fragments based on a secret sharing scheme in which less than all of the encrypted file fragments are needed to reconstruct the encrypted file;
distributing the file fragments to a plurality of storing peers for storing the file fragments off-chain;
splitting an encryption key used to encrypt the file into a plurality of key fragments;
encrypting each key fragment based on a public key of a different storing peer; and
storing the respectively encrypted key fragments on a distributed ledger that is accessible to a plurality of blockchain peers such that each encrypted key fragment is associated with the encrypted file.

9. The method of claim 8, wherein the method further comprises encrypting the file with a symmetric encryption key.

10. The method of claim 8, wherein the method further comprises encrypting each key fragment with a respective public key of the storing peer where the file fragment is being stored prior to distributing the encrypted file fragments to the storing peers.

11. The method of claim 8, wherein the splitting the encryption key comprises splitting the encryption key into the plurality of key fragments using a secret sharing scheme in which less than all of the key fragments are needed to reconstruct the encryption key.

12. The method of claim 11, wherein the splitting the encryption key further comprises encrypting each key fragment with a respective public key of a storing peer from among the plurality of storing peers prior to storing the encrypted key fragments on the distributed ledger.

13. The method of claim 8, wherein the plurality of storing peers are connected to the blockchain network and each storing peer includes a storage component implemented off-chain from the blockchain network and controlled by the respective storing peer.

14. The method of claim 8, wherein the method further comprises broadcasting the encrypted key fragments and the encrypted file fragments to a plurality of blockchain peer nodes included in the blockchain network for storage on the distributed ledger.

15. A non-transitory computer readable medium comprising instructions, that when read by a processor, cause the processor to perform:
splitting an encrypted file into a plurality of file fragments based on a secret sharing scheme in which less than all of the encrypted file fragments are needed to reconstruct the encrypted file;
distributing the file fragments to a plurality of storing peers for storing the file fragments off-chain;
splitting an encryption key used to encrypt the file into a plurality of key fragments;
encrypting each key fragment based on a public key of a different storing peer; and
storing the respectively encrypted key fragments on a distributed ledger that is accessible to a plurality of blockchain peers such that each encrypted key fragment is associated with the encrypted file.

16. The non-transitory computer readable medium of claim 15, wherein the method further comprises encrypting the file with a symmetric encryption key.

17. The non-transitory computer readable medium of claim 15, wherein the method further comprises encrypting each key fragment with a respective public key of the storing peer where the file fragment is being stored prior to distributing the encrypted file fragments to the storing peers.

18. The non-transitory computer readable medium of claim 15, wherein the splitting the encryption key comprises splitting the encryption key into the plurality of key fragments using a secret sharing scheme in which less than all of the key fragments are needed to reconstruct the encryption key.

19. The non-transitory computer readable medium of claim 15, wherein the plurality of storing peers are connected to the blockchain network and each storing peer includes a storage component implemented off-chain from the blockchain network and controlled by the respective storing peer.

20. The non-transitory computer readable medium of claim 15, wherein the method further comprises broadcasting the encrypted key fragments and the encrypted file fragments to a plurality of blockchain peer nodes included in the blockchain network for storage on the distributed ledger.

* * * * *